(No Model.)
W. H. PERRY.
SPIKE.
No. 270,840. Patented Jan. 16, 1883.
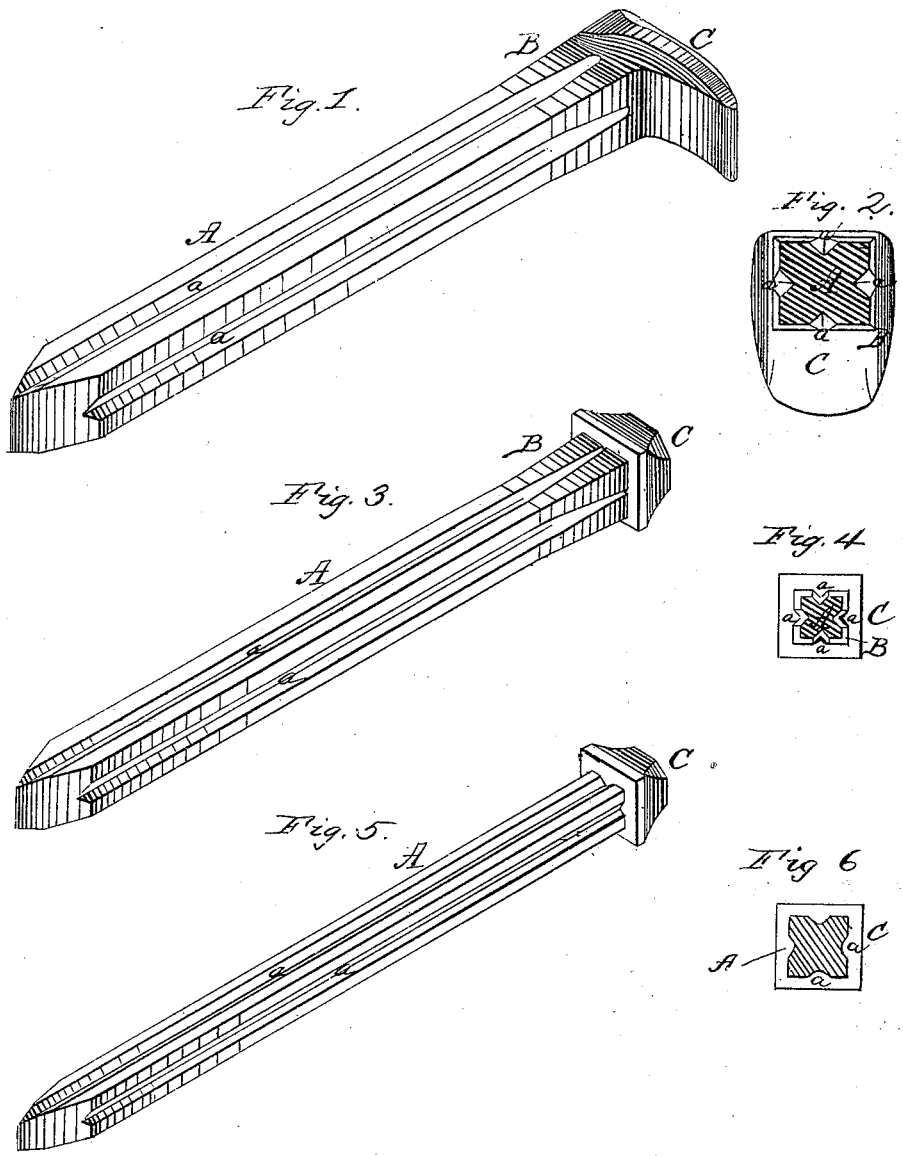

UNITED STATES PATENT OFFICE.

WILLIAM H. PERRY, OF SHARON, PENNSYLVANIA.

SPIKE.

SPECIFICATION forming part of Letters Patent No. 270,840, dated January 16, 1883.

Application filed September 23, 1882. (No model.)

*To all whom it may concern:*

Be it known that I, WILLIAM H. PERRY, of Sharon, in the county of Mercer and State of Pennsylvania, have invented certain new and useful Improvements in Spikes; and I do hereby declare that the following is a full, clear, and exact description of the invention, which will enable others skilled in the art to which it appertains to make and use the same, reference being had to the accompanying drawings, which form a part of this specification, in which—

Figure 1 is a perspective, and Fig. 2 a section, of a railroad-spike made according to my invention. Fig. 3 is a perspective, and Fig. 4 a section, of my boat-spike; and Figs. 5 and 6 similar views of a modification.

The object of my invention is to provide a spike having an increase of strength over that of spikes constructed in the ordinary manner and a decrease of weight as compared with its size and that of a spike of the usual form.

My invention consists in forming a spike having four sides with angular or semicircular grooves on each side, said grooves extending from the head to the point.

It consists, further, in forming a spike with an enlargement of the shank, extending from the head to a point somewhat below the same and tapering down from the head to the shank, such enlarged portion and the rest of the shank being provided on each of its four sides with a groove which is continuous from the point to the head, but of less depth on the enlarged portion than the rest of the shank.

The method of manufacturing the spike is as follows: A blank of proper length is cut from a rod having a longitudinal groove on each side. The head and the enlarged portion are then formed by upsetting or stamping, so as to leave the grooves upon the said enlarged portion but gradually diminishing in depth and width toward the head.

Referring to the accompanying drawings, A represents the shank of the spike, square in cross-section, and having on its four sides grooves *a a*, angular or rounded, extending from the point of the shank to the head. B represents the tapering enlargement of the shank below the head, and C the head of the spike. The grooves *a a* are alike on all four sides of the shank, and extend, as shown, from the point to the head, following the incline of the tapered portion B, but diminishing gradually on said tapered portion.

The advantages of the construction herein described are briefly as follows: The grooves in the sides of the spike facilitate the introduction of the same into the wood by receiving a portion of the wood, while very materially reducing the weight of the spike without decreasing its strength. The tendency to break or bend at that portion which receives the greatest amount of strain—*i. e.*, the portion of the shank immediately below the head—is avoided by making that part larger and heavier than the rest of the shank. By continuing the grooves upon the enlarged portion I avoid a too sudden enlargement of the shank, which would interfere with the driving of the spike.

In Fig. 5 of the drawings I have shown a spike of small diameter, wherein the enlargement of the shank below the head is dispensed with. This form of spike is well adapted to spikes of small size—such as boat-spikes.

Having described my invention, I claim—

1. A square spike having its four sides grooved from the point to the head and having an enlargement of the shank below the head, substantially as described.

2. A square spike having a groove on each of its four sides, said grooves extending from the point of the spike to the head thereof, substantially as described.

3. A square spike having a tapering enlargement of the shank below the head and having a groove on each of its four sides from head to point, substantially as described.

In testimony that I claim the foregoing as my own I have hereto affixed my signature in presence of two witnesses.

WILLIAM H. PERRY.

Witnesses:
ADDIS E. CARTER,
JNO. H. NIKIRT.